United States Patent [19]

Teletzke

[11] 3,959,125

[45] May 25, 1976

[54] TREATMENT AND DISPOSAL OF SEWAGE SLUDGE

[75] Inventor: Gerald H. Teletzke, Wausau, Wis.

[73] Assignee: Sterling Drug Inc., New York, N.Y.

[22] Filed: Apr. 21, 1975

[21] Appl. No.: 570,035

Related U.S. Application Data

[63] Continuation-in-part of Ser. No. 485,981, July 5, 1974, abandoned.

[52] U.S. Cl. .................................. 210/10; 210/12; 210/15; 210/16
[51] Int. Cl.² ........................................... C02C 3/00
[58] Field of Search .................. 210/10, 12, 15, 16, 210/17, 63, 67, 71

[56] References Cited
UNITED STATES PATENTS

| | | | |
|---|---|---|---|
| 2,850,449 | 9/1958 | Torpey | 210/10 |
| 3,060,118 | 10/1962 | Schoeffel | 210/3 |
| 3,247,102 | 4/1966 | Priesing et al. | 210/10 |
| 3,256,179 | 6/1966 | Teletzke et al. | 210/16 |
| 3,649,531 | 3/1972 | Brown et al. | 210/10 |
| 3,697,417 | 10/1972 | Teletzke et al. | 210/10 |
| 3,824,186 | 7/1974 | Erickson et al. | 210/10 |
| 3,876,536 | 4/1975 | Pradt et al. | 210/10 |

*Primary Examiner*—Thomas G. Wyse
*Attorney, Agent, or Firm*—Thomas L. Johnson; B. Woodrow Wyatt

[57] ABSTRACT

A process for treatment and land disposal of sewage sludge which comprises heat treatment followed by biological digestion, anaerobic and/or aerobic, providing a fluid sludge suitable for distribution on land.

7 Claims, No Drawings

TREATMENT AND DISPOSAL OF SEWAGE SLUDGE

This application is a continuation-in-part of my prior copending application, Ser. No. 485,981, filed July 5, 1974, now abandoned.

BACKGROUND OF THE INVENTION

1. Field of the Invention

This invention relates to a process for treatment and disposal of sewage sludge.

2. Description of the Prior Art

Sewage sludge contains moisture holding organic matter and nutrients that can be beneficial when returned to nutrient and organic-poor but well drained agricultural land.

Sewage sludge in its originally derived form is unacceptable for land disposal for several reasons, including:

1. Raw sewage sludge contains all of the disease organisms common to man, as well as undesirable plant seeds. This material, in an untreated form, presents a health hazard and can create undesirable plant growths.
2. Raw or undigested sewage sludge is highly putrescible and can be a nuisance, particularly from an odor standpoint, if it is allowed to decompose under uncontrolled conditions on the land. Decaying matter can also encourage undesirable insect propagation.
3. If applied to agricultural land in an indiscriminate manner and at excessive application rates, the nitrogen in the sludge can contaminate ground water in the application area.

The known methods of processing sewage sludge involve thermal conditioning in such a manner as to improve the dewaterability of the sludge so that the solid and liquid phases are readily separated, as by sedimentation, filtration, centrifugation, etc., and the solid and liquid phases are then disposed of or subjected to further treatment separately (Teletzke et al. U.S. Pat. No. 3,256,179; Teletzke et al. U.S. Pat. No. 3,697,417; Erickson et al. U.S. Pat. No. 3,824,186).

SUMMARY OF THE INVENTION

The invention relates to a process for conditioning sewage sludge for disposal on land which comprises heating the sludge at a temperature between about 65°C. and about 150°C. for a time between about 30 seconds and about 60 minutes, the time varying inversely with the temperature; and, without any separation of solid and liquid phases, treating the resulting fluid sterilized sewage sludge by biological digestion at a temperature between about 32°C. and 60°C.

The biological digestion can consist of an aerobic process or an anaerobic process, or a combination of both.

A further aspect of the invention lies in the further step of transporting the fluid sludge after biological digestion to a land application site and distributing it at a load rate of less than about 300 pounds of nitrogen per acre per year.

DETAILED DESCRIPTION INCLUSIVE OF PREFERRED EMBODIMENTS

The term "sewage sludge" as used herein is intended not only to include conventional sewage wastes derived from flush toilets commonly used in western countries, but also to include similar concentrated wastes of human or animal origin, such as night soil produced in oriental countries. The sewage sludge is physically an aqueous slurry or suspension of waste solids.

The object of the present invention is to condition sewage sludge so that it is devoid of undesirable microorganisms and reduced in septic and odor-producing properties and therefore acceptable for land disposal. This is realized by:

a. Heating the sludge to a sufficient temperature for a long enough period of time to inactivate pathogenic organisms and plant seeds in the sludge and to degrade organic matter to more readily digestible substances, but restricting the time and temperature of heating to a range which does not substantially decrease the water-holding characteristics of the treated solids.

b. Treating the resulting fluid sterilized sewage sludge without dewatering by biological digestion at a temperature between about 90°F. and 140°F. (32° and 60°C.).

The biologically digested sewage sludge is then suitable for distribution on land without previously separating or dewatering the sludge solids.

While the individual steps of sterilization of sludge by heat and biological decomposition of sludge are separately known in the art, the particular combination and sequence of those steps herein described give advantages which have not previously been realized.

In the process of the instant invention sludge is sterilized before biological degradation. Although sludge has previously been sterilized or pasteurized after anaerobic digestion, this is the first time that heat treatment prior to sludge digestion has been proposed. The advantages of doing heat treatment sterilization before digestion are:

a. Heat treatment renders the organic matter in the sludge more biodegradable. Heat treatment before biological digestion, therefore, improves digestion by giving greater decomposition in a shorter time.

Experiments conducted in which sewage sludge was seeded with 25% by volume of well-digested sludge and anaerobically digested to produce combustible gas (methane), both in its raw state and after cooking showed that digestion of a seeded cooked sludge consistently produced more gas in a given time than the digestion of uncooked raw sludge. Summary results of a number of batch experiments (an average of two or more experiments) are as follows:

| Days of Digestion at 95°F. | Cooked Sludge Preparation COoking Time — Temperature Minutes | °F. | % Additional Total Gas Production Compared to Uncooked Sludge Treatment |
| --- | --- | --- | --- |
| 16 | 3 | 176 | +10 |
| 16 | 3 | 212 | + 9 |
| 16 | 60 | 212 | +11 |
| 16 | 3 | 248 | +20 |
| 18 | 60 | 248 | +26 |

The data indicate that up to 26% more gas was obtained in an 18 day digestion period when sludge was cooked for 60 minutes at 248°F. before digestion. Nearly as good results were obtained (20% additional gas) by cooking for 3 minutes at 248°F.

If sludge is heated for sterilization purposes after biological digestion, biologically stable organic matter may be converted to biodegradable matter which is available for decomposition later, causing a possible nuisance at the ultimate disposal site. Also, heat treatment after digestion creates soluble nutrients which are more readily available for drainage to groundwater or runoff.

b. Heat treatment of sludge creates a warm sludge which is conducive to efficient biological action. No other external heating is required. If sludge is sterilized after biological action, the residual heat remaining in it is lost rather than put to beneficial use in controlled decomposition.

c. By introducing a sterile nutrient sludge into a biological treatment step, the biology of the system can be controlled by seeding of the desired organisms and adjusting environmental conditions to sustain the most desirable type of biological growth. When unsterilized raw sludge is introduced to a biological digestion the biota present are uncontrollable since the feed stock itself is a mixed culture of many types of micro-organisms.

d. The process proposed, i.e., heat treatment, to inactivate undesirable organisms, followed by biological digestion to reduce potential nuisance (odor, etc.) forming conditions, leaves a fluid sludge, desirable for direct fertilizer application on land. Dewatering is unnecessary because the material is biologically stable and relatively nuisance free, and undesirable since much of the nutrient value of the material is in soluble form as ammonia.

The process proposed may take several variations as described below.

1. A sludge heating step in which the temperature to which the sludge is heated and the holding time is sufficient to render the sludge free of disease-producing micro-organisms and viable plant seeds. The time-temperature range of "cooking" for sterilization purposes may be from about 60 minutes at about 150°F. (65°C.) to about 30 seconds at about 300°F. (150°C.), the time varying inversely with the temperature. A preferred condition is about 250°F. (120°C.) for about 10 minutes. The "cooking" process also renders the organic matter in the sludge more susceptible to subsequent biological degradation (digestion). Longer than minimum "cooking" times will increase the solubilization and subsequent biological degradation of the organic matter.

The heating step is preferably carried out in the absence of substantial amounts of oxygen (air) so that no appreciable reduction in chemical oxygen demand of the sewage sludge is brought about through oxidation.

2. The sterile sewage sludge is discharged at a warm temperature, between about 100° and 150°F., to a biological degradation step in which seed organisms in a tank degrade the putrescible organic matter to gases and biologically stable organic matter. The biological treatment step may be either anaerobic or aerobic. In the anaerobic process the warm, sterile sludge is discharged to a covered tank (either fixed or floating cover), having an average retention time of about 5 to 20 days. During initial operations the anaerobic tank may be seeded with soil bacteria. Rich agricultural loam containing soil organisms can be used for this purpose. The anaerobic decomposition of the sterile putrescible sludge results in the production of methane gas which can be burned and used as fuel in the sludge heat treatment process. The tank may be equipped with mechanical or gas diffusion mixing to encourage optimum mixing of seed and sludge feed. The anaerobic process functions efficiently in the range of 90° to 140°F. (32° to 60°C.) A preferred temperature is 95°–100°F. The temperature of the bio-digestion may be controlled at the desired level by controlling the temperature of the heated sludge discharged to it.

Modifications of the biological stabilization step are possible and appropriate in certain situations. For example, aerobic digestion is preferred over anaerobic digestion in a case where the sludge contains significant quantities of toxic metals such as copper which in small concentration will inhibit anaerobic decomposition, but not aerobic digestion. Aerobic digestion of the sterile sludge may be achieved by aerating the sludge introduced at about 100° to 150°F. for a period varying from one to ten days. The aerobic decomposition is carried out in an open tank in which oxygen is diffused, either by mechanical aeration or by diffusing an oxygen containing gas throughout the contents of the tank. Putrescible organic matter in the introduced sludge is decomposed to carbon dioxide and water. The aerobic decomposition process is greatly accelerated by the warm temperatures of the sludge being fed to the process. Aerobic decomposition proceeds at a very slow rate at temperatures less than 65°F. To obtain reasonably rapid rates of decomposition, temperatures exceeding 90°F. (preferred temperature 110°F are desirable in aerobic digestion. The aerobic digestion may also be seeded by introducing soil organisms during initial operations. Another possible modification is heat treatment followed in sequence by anaerobic and aerobic digestion. This scheme gives the advantages of energy recovery (gas for fuel) of the anaerobic process and provides for aerobic "polishing" of the anaerobic sludge effluent which is in a chemically reduced state. For example, an anaerobically digested sludge containing sulfur compounds will have the sulfur present in the form of sulfides or mercaptans, which not only could be undersirably odorous, but also create undesirably high oxygen demands on the soil to which it is applied. Aerobic treatment of this sludge oxidizes the sulfides and improves the odor as well as reduces the oxygen demands at the final soil application site.

The latter two stage biological treatment requires less power for aeration in the aerobic stage than in the modification using aerobic digestion only, since the anaerobic stage removes the major part of the oxygen demand by anaerobic decomposition.

3. The liquid sludge exiting from the biological digestion is either distributed directly on the land, or is transported to a storage tank or a lagoon in which it is retained until it is convenient to apply to the land. The sludge does not have an unpleasant odor at this point and may undergo further "maturing" in the storage basin. The sludge applied to the land is applied at a loading rate controlled by the amount of nitrogen remaining in the sludge. The loading rate should be less than about 300 pounds of nitrogen per acre per year, usually in the range of 80 to 300 pounds of nitrogen per acre per year (35 to 135 kilograms of nitrogen per 4000 square meters per year), the amount varying depending upon the number of years of application, the crop utilization of nitrogen, and soil factors. Sewage sludge containing a high percentage of nitrogen must be applied at a lower rate than sludge containing a low nitrogen concentration. If the nitrogen application is excessive, nitrogen compounds will appear in the surface and ground drainage waters from the area. Since most of the nitrogen in biologically treated sludge will be present in the soluble ammonia form, a desirable fertilizing nutrient, application of the fluid sludge to land without dewatering is most desirable from an agricultural standpoint. However, if the nitrogen content is too great for safe disposal, a substantial portion of it can be removed by dewatering the sludge, conveniently by decanting the supernatant liquor if obtainable from the storage basin. Therefore, if desired, supernatant liquor can be removed from the storage basins or lagoons to reduce the amount of nitrogen in the residual sludge, which then will require less land area for ultimate disposal than if the entire volume of treated sludge were applied to the land. In some cases it may be attractive to add water to the treated sludge to further elutriate soluble nitrogen by decantation before applying the residual sludge to the land.

The following examples will further illustrate the invention without the latter being limited thereby.

Raw sludge having 3.6% total solids containing 67% volatile matter is heated to 25°F. for 10 minutes. Heating is accomplished in countercurrent heat exchangers and a reactor. Cold sludge at approximately 60°F. is pumped into the system through a heat exchanger and then to a reactor which is maintained at the desired temperature either by injecting steam into the reactor or by steam or other liquid heated heat exchangers just prior to the reactor. The heated sludge exits the system, passing countercurrent to the incoming cold sludge. the heated sludge leaves the system at a temperature of 90° to 150°F. and enters an anaerobic digestion tank. Sufficient combustible gas is produced in the anaerobic digestion to provide the fuel required for the heat treatment step. Under usual conditions 10 to 15 days' detention time are provided in the anaerobic digestion tank, during which time approximately 40% of the volatile solids in the sludge are converted to burnable gas. If, for example, 50 gallons per minute (72,000 gallons per day) of sludge containing 14,400 lbs. of volatile solids is introduced, and 40% of these solids having a fuel value of 10,000 BTU per pound of volatile solids are converted to gas, the amount of fuel available is 14,400 × 10,000 = 57.6 million BTU per day. The heat required to raise the temperature of the incoming sludge from 60°F. to 100°F. is approximately 72,200 × 8.33 × 40 = 24 million BTU. Therefore, a 40% conversion of the fuel value in the gas to heat transferred to the incoming sludge will give sufficient heat to maintain desirable temperatures without the necessity for providing additional fuel. The warm sludge exiting the heat exchangers passes through a closed digestion tank equipped with gas collection equipment where it mixes with previously seeded and digested sludge and the digestion proceeds. Approximately 40% volatile solids reduction to gas is achieved in a 10 to 15 day detention time. After passing through the digester, the stable sludge normally will pass to a storage lagoon where it will remain until land and weather conditions are acceptable for spreading the sludge on the land.

In cases where aerobic digestion is used instead of anaerobic digestion, an oxygen-bearing gas is supplied to the digesting mixture, which digestion is carried out either in an open or closed tank held at about 110°F. Approximately 40% reduction of volatile solids will be obtained in a 10 day retention period when sufficient oxygen is supplied to maintain a residual dissolved oxygen content of at least 0.05 mg/l. If aerobic digestion is used, there will not be any recovery of combustible gas and all the fuel required to maintain a desired digestion temperature will have to be supplied from an outside source. The aerobically digested sludge will again go to a storage lagoon to await convenient distribution to the land.

If aerobic digestion is to follow anaerobic digestion, it normally will be advantageous to provide at least 15 days' detention time in anaerobic digestion to obtain maximum volatile solids reduction of approximately 50%, followed by an aerobic "polishing" of 1 to 5 days' detention time, in which the dissolved oxygen content is maintained at at least 0.5 mg/l.

I claim:

1. A process for conditioning sewage sludge for disposal on land which comprises the steps of:
   a. rendering the sludge free of disease-producing microorganisms and viable plant seeds by heating the sludge at a temperature between about 65°C. and about 150°C. for a time between about 30 seconds and about 60 minutes, the time varying inversely with the temperature; and
   b. without any separation of solid and liquid phases treating the resulting fluid sterilized sewage sludge by biological digestion at a temperature between about 32°C. and 60°C.

2. A process according to claim 1 in which the fluid sludge after biological digestion is transported to a land application site and distributed at a load rate of less than 300 pounds of nitrogen per acre per year.

3. A process according to claim 1 in which the biological digestion is an anaerobic process with a retention time of about 5 to 20 days.

4. A. process according to claim 1 in which the biological digestion is an aerobic process with a retention time of about 1 to 10 days.

5. A process according to claim 1 in which the biological digestion is an anaerobic process with a retention time of about 5 to 20 days followed by an aerobic process with a retention time of about 1 to 10 days.

6. A process according to claim 1 in which the sludge after biological digestion is treated with water in a storage basin and then dewatered to elutriate soluble nitrogen prior to distributing it on land.

7. A process according to claim 3 in which the combustible gases produced by the anaerobic process are used as fuel to heat the sludge in step (a) of claim 1.

* * * * *

UNITED STATES PATENT AND TRADEMARK OFFICE
CERTIFICATE OF CORRECTION

PATENT NO. : 3,959,125
DATED : May 25, 1976
INVENTOR(S) : Gerald H. Teletzke

It is certified that error appears in the above-identified patent and that said Letters Patent are hereby corrected as shown below:

Column 5, line 28, "25°F." should read --250°F.--;

line 45, "72,000" should read --72,200--.

Column 6, line 13, "0.05" should read --0.5--.

Signed and Sealed this

Seventh Day of September 1976

[SEAL]

*Attest:*

RUTH C. MASON
*Attesting Officer*

C. MARSHALL DANN
*Commissioner of Patents and Trademarks*